United States Patent
Grebennikov et al.

(10) Patent No.: US 12,086,243 B2
(45) Date of Patent: Sep. 10, 2024

(54) SYSTEMS AND METHODS FOR DETECTING USAGE ANOMALIES BASED ON ENVIRONMENTAL SENSOR DATA

(71) Applicant: Acronis International GmbH, Schaffhausen (CH)

(72) Inventors: Nikolay Grebennikov, Moscow (RU); Candid Wüest, Bassersdorf (CH); Serguei Beloussov, Costa Del Sol (SG); Stanislav Protasov, Singapore (SG)

(73) Assignee: Acronis International GmbH, Schaffhausen (CH)

( * ) Notice: Subject to any disclaimer, the term of this patent is extended or adjusted under 35 U.S.C. 154(b) by 149 days.

(21) Appl. No.: 17/539,308

(22) Filed: Dec. 1, 2021

(65) Prior Publication Data

US 2022/0207136 A1   Jun. 30, 2022

Related U.S. Application Data

(60) Provisional application No. 63/130,974, filed on Dec. 28, 2020.

(51) Int. Cl.
   *G06F 21/55*   (2013.01)

(52) U.S. Cl.
   CPC ...... *G06F 21/554* (2013.01); *G06F 2221/034* (2013.01)

(58) Field of Classification Search
   CPC ............. G06F 21/554; G06F 2221/034; G06F 2221/2111; G06F 21/316
   See application file for complete search history.

(56) References Cited

U.S. PATENT DOCUMENTS

| | | | |
|---|---|---|---|
| 2003/0023874 A1* | 1/2003 | Prokupets | G06F 21/32 726/4 |
| 2010/0205309 A1* | 8/2010 | Skog | H04L 65/1036 709/227 |
| 2014/0283014 A1* | 9/2014 | Tse | G06F 21/316 726/19 |
| 2019/0245877 A1* | 8/2019 | Toth | H04L 63/1425 |
| 2019/0272361 A1* | 9/2019 | Kursun | H04L 67/535 |

\* cited by examiner

*Primary Examiner* — Meng Vang
*Assistant Examiner* — Tania M Pena-Santana
(74) *Attorney, Agent, or Firm* — ArentFox Schiff LLP; Michael Fainberg

(57) ABSTRACT

Disclosed herein are systems and method for detecting usage anomalies based on environmental sensor data. A method may include: receiving a physical user input at a computing device located in an environment; determining whether the physical user input was received from an authorized user of the computing device by: retrieving environmental sensor data from at least one sensor located in the environment; identifying a window of time during which the physical user input was received; and verifying a presence of the authorized user at the environment during the window of time based on the environmental sensor data; and in response to determining that the authorized user was not present in the environment during the window of time, detecting a usage anomaly and not executing the physical user input.

15 Claims, 3 Drawing Sheets

SYSTEMS AND METHODS FOR DETECTING USAGE ANOMALIES BASED ON ENVIRONMENTAL SENSOR DATA

CROSS-REFERENCE TO RELATED APPLICATIONS

This application claims the benefit of U.S. Provisional Application No. 63/130,974, filed Dec. 28, 2020, which is herein incorporated by reference.

FIELD OF TECHNOLOGY

The present disclosure relates to the field of data security, and, more specifically, to systems and methods for detecting usage anomalies based on environmental sensor data.

BACKGROUND

Conventional data security systems often rely on rudimentary authentication procedures (e.g., a typed password, a fingerprint, a face match, etc.) to provide access to protected data. In some cases, there may be two-step authentication in which the user confirms his/her identity using a verification code emailed or texted to a trusted device registered in the security system. However, in either case, the authentication can be easily forged.

Moreover, existing security solutions are limited to software-based traces and attacks. For example, applications such as ZeroTrust and user and entity behavior analytics (UEBA) commonly focus on information technology (IT) software events such as logins, program starts, etc. Such solutions are not very efficient and have a high false-positive rate with insider attacks.

There is an increasing trend in compromised credentials and attacks in the physical environment (e.g., unlocked machine in the office being used by cleaning staff to do malicious activity). There thus exists a need to detect usage anomalies that cannot be determined using software events alone.

SUMMARY

In one exemplary aspect, the techniques described herein relate to a method for detecting usage anomalies based on environmental sensor data, the method including: receiving a physical user input at a computing device located in an environment; determining whether the physical user input was received from an authorized user of the computing device by: retrieving environmental sensor data from at least one sensor located in the environment; identifying a window of time during which the physical user input was received; and verifying a presence of the authorized user at the environment during the window of time based on the environmental sensor data; and in response to determining that the authorized user was not present in the environment during the window of time, detecting a usage anomaly and not executing the physical user input.

In some aspects, the techniques described herein relate to a method, further including: notifying the authorized user of the usage anomaly.

In some aspects, the techniques described herein relate to a method, further including: in response to determining that the authorized user is present in the environment, correlating the user input with the environmental sensor data by time to verify whether the authorized user had physical access to the computing device; and in response to determining that the authorized user had physical access to the computing device, executing the physical user input.

In some aspects, the techniques described herein relate to a method, further including: in response to determining that the authorized user did not have physical access to the computing device, not executing the physical user input and notifying the authorized user of the usage anomaly.

In some aspects, the techniques described herein relate to a method, wherein correlating the user input with the environmental sensor data by time further includes: determining whether the environmental sensor data indicates whether the authorized user left the environment before the physical user input was received.

In some aspects, the techniques described herein relate to a method, wherein the at least one sensor includes one or more of: (1) a camera installed at the environment, (2) a door badge scanner at the environment, (3) a light sensor at the environment, (4) a microphone at the environment, (5) a personal computing device of the authorized user.

In some aspects, the techniques described herein relate to a method, wherein determining whether the physical user input was received from the authorized user of the computing device further includes: transmitting, via the computing device, a discovery message to all computing devices in the environment in the vicinity of the computing device; receiving a confirmation message from another computing device, wherein confirmation message includes an identifier of the another computing device; determining whether the identifier of the another computing device is present in a database of authorized identifiers; and in response to determining that the identifier is not present in the database, determining that the physical user input was not received from the authorized user.

In some aspects, the techniques described herein relate to a method, wherein the physical user input includes accessing data that is restricted to the authorized user.

It should be noted that the methods described above may be implemented in a system comprising a hardware processor. Alternatively, the methods may be implemented using computer executable instructions of a non-transitory computer readable medium.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Exemplary aspects are described herein in the context of a system, method, and computer program product for detecting usage anomalies based on environmental sensor data. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

The present disclosure thus presents systems and methods for detecting usage anomalies. Techniques of the present disclosure use data sources that are not directly related to the software or hardware on which malicious activity was performed. Exemplary data sources include as CCTV, door badges, light sensors, voice assistants, etc., as additional trackers of an anomaly detection system (e.g., to determine if a user is indeed in front of their office computer or whether they in fact arrived to the office on that day). The techniques further train an artificial intelligence (AI) decision model with this data to improve the accuracy of the decisions made on software based indicators. More specifically, an implementation may involve gathering real-time data from related environment systems (e.g., Internet of Things (IoT) devices), correlating these log files with user activity (e.g., logins and unlocks), and adding them as additional data source to the AI decision engine.

Figure 1:
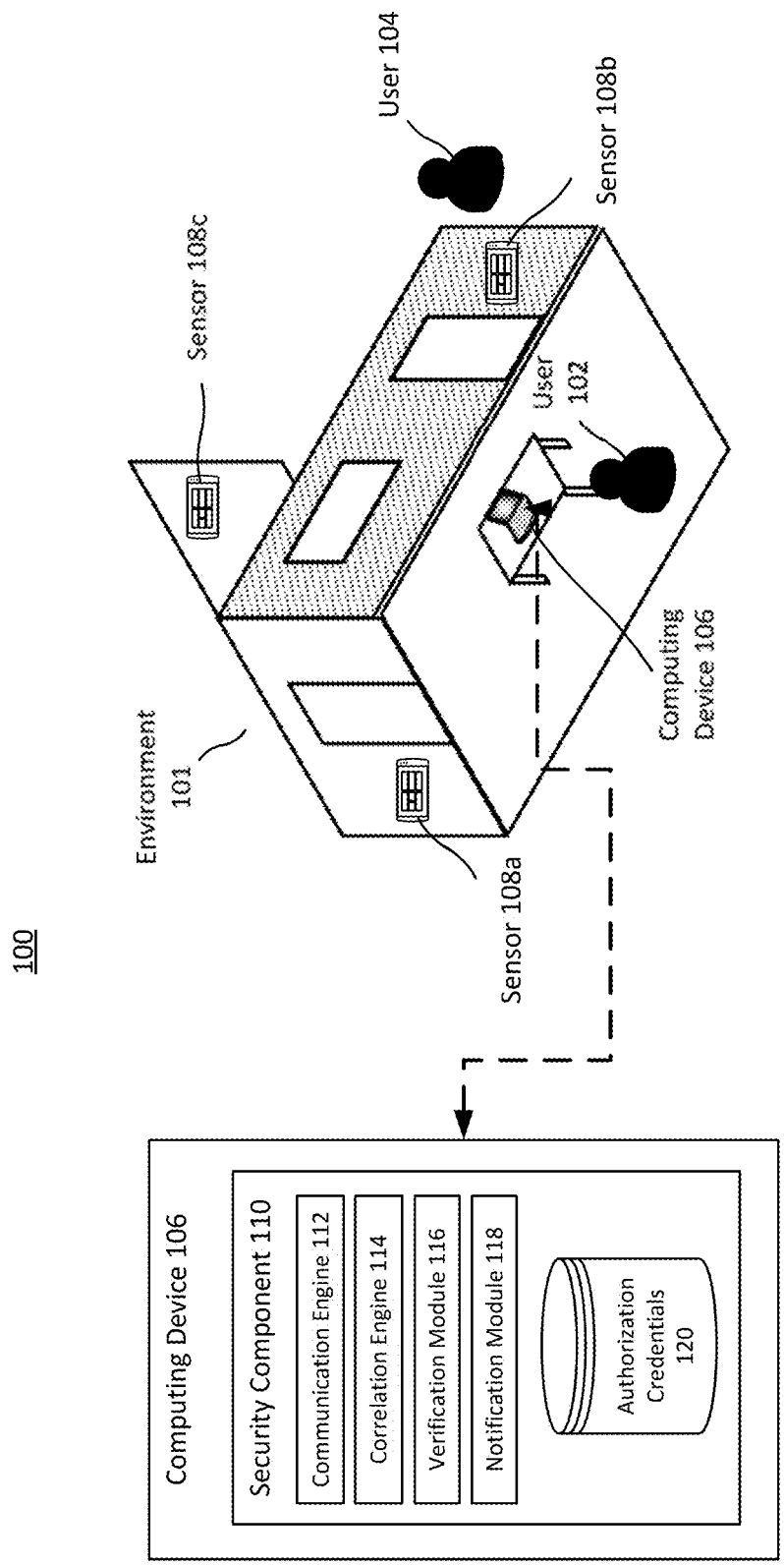
FIG. 1 is a block diagram illustrating a system for detecting usage anomalies based on environmental sensor data.

FIG. 1 is a block diagram illustrating system 100 for detecting usage anomalies based on environmental sensor data. Consider an environment 101 that comprises computing device 106. Environment 101 may be, for example, an office and computing device may be, for example, a work laptop provided by an employer. Security component 110 may be a data security software installed on computing device 106 for detecting usage anomalies (i.e., user inputs coming from an unknown entity). In some aspects, security component 110 may be installed on a different device (e.g., a remote server) that is connected to computing device 106 and each sensor 108 in environment 101. In some aspects, the application of security component 110 on the different device may be a thick client application and the application of security component 110 on computing device 106 may be a thin client application. The thin client application may transmit information to the thick client application about received user inputs and the thick client application may determine whether the user inputs should be executed.

Security component 110 may comprise communication engine 112 that retrieves data from sensors 108a and 108b in environment 101 and sensor 108c that is in the vicinity of environment 101. Security component 110 may further comprise authorization credentials 120, which is a database of identifiers of authorized users of computing device 106. Security component 110 may further comprise verification module 116, which determines whether an authorized user provided a user input received by computing device 106. Security component 110 may further comprise a correlation engine 114, which temporally aligns a received user input and environmental sensor data retrieved by communication engine 112. Security component 110 may also comprise a notification module 118 that alerts authorized user(s) and/or an administrator of usage anomalies.

In FIG. 1, user 102 may be physically present in environment 101. In an exemplary aspect, computing device 106 may receive a physical user input (e.g., a login attempt via a keyboard or touchpad of computing device 106) from user 102. In some aspects, the physical user input is a request to access data that is restricted to an authorized user (e.g., only the authorized user may access the data). Security component 110 may intercept the user input in order to determine whether the physical user input was received from an authorized user of computing device 106. Communication engine 112 may retrieve environmental sensor data from at least one sensor (e.g., 108a, 108b) located in the environment 101 or at least one sensor located near environment 101 (e.g., 108c). For example, environment 101 may be an office of user 104. Examples of sensors include, but are not limited to, a camera, a door badge scanner, a light sensor, a microphone at the environment, and a personal computing device of an authorized user. These sensors may be placed inside the office, or in the building where the office is located, or outside the building where the office is located. For example, sensor 108a may be a smart speaker and sensor 108b may be a facial/ID scanner.

Security component 110 may further identify a window of time during which the physical user input was received. The length of the window of time may be predetermined (e.g., 10 minutes). For example, the physical user input may be received at 4:30 pm. The window of time may thus be between 4:25 pm and 4:35 pm.

Verification module 116 may then verify a presence of an authorized user at environment 101 during the window of time based on the environmental sensor data. For example, the environmental sensor data originating from sensor 108a may be an audio clip comprising a voice of user 102 and the environmental sensor data originating from sensor 108b may be a captured facial image of user 102 when he/she entered environment 101.

Authorization credentials 120 may be a database that comprises voice patterns and facial images of all authorized users of computing device 106. In some aspects, verification module 116 may compare the retrieved environmental sensor data with the data in the authorization credentials 120 to determine if there is a match. More specifically, security component 110 determines whether the authorized user was present in environment 101 during the window of time. Suppose that the authorized user is user 104, who used computing device 106 briefly before stepping out of his/her office. User 102 may be an intruder that has attempted to gain access to computing device 106. In response to determining that authorized user 104 was not present in environment 101 during the window of time, security component 110 detects a usage anomaly.

As stated, sensors 108a-c may collect information such as audio clips, images, badge scans, biometrics (e.g., retinal or fingerprint scans), etc. Security component 110 parses this information to produce identifiers that can be compared with entries in authorization credentials 120. For example, sensor 108b may capture video and security component 110 may analyze each frame to extract a group of pixels that represent a facial image. Verification module 116 may compare the group of pixels to facial images in authorization credentials 120. Likewise, if sensor 108b collects audio clips, security component 110 may isolate portions of the audio clips that include human speech. Verification module 116 may compare the human speech with vocal information (e.g., temporal and frequency information in authorization credentials 120) to determine whether an authorized user's speech shares characteristics of the extracted speech.

Preventing anomaly false positives is a difficult task because there are many ways the required information may not be collected adequately. For example, depending on the placement of each sensor and the angle at which a user approaches computing device 106, the user's face may not be captured at an angle that is comparable to the facial images in authorization credentials 120. Likewise, if the user is speaking at a low volume and his/her voice is drowned out by noise, the comparison of human speech may be ineffective. Because sensor placement is a factor in the quality of the environmental sensor data, security component 110 may utilize a weighting system that gives greater weight to sensor data from sensors that are closer to computing device 106. Referring to FIG. 1, the information captured by sensors 108b and 108a will be given greater weight than sensor 108c. In some aspects, security component 110 may track all sensors in the vicinity of a particular computing device and only consider environmental sensor data from those sensors. The list of sensors may be predetermined and may be manually updated whenever new sensors are introduced, old sensors are physically removed from an area, and/or sensor placement or computing device placement is changed.

Another device that security component 110 may consider is a device that is physically with a user. For example, users often carry a smartphone with them. Security component 110 may determine whether a physical user input on computing device 106 was received from an authorized user of the computing device by transmitting, via computing device 106, a discovery message (e.g., via Simple Service Discovery Protocol or an equivalent) to all computing devices in environment 101—specifically in the vicinity of computing device 106 (e.g., within a range at which the discovery message may be received by the device). The discovery message may query an identifier of the device (e.g., a MAC address, IP address, device name, etc.). In response to the discovery message, security component 110 may receive a confirmation message from another computing device (e.g., a smartphone of a user). The confirmation message may include the queried identifier of the another computing device. This identifier is also treated as part of the environmental sensor data.

Verification module 116 may determine whether the identifier of the another computing device is present in a database of authorized identifiers (e.g., authorization credentials 120). For example, an authorized user may register an identifier of a device that the authorized user carries with him/her in authorization credentials 120. If an unauthorized user's device is detected (e.g., verification module 116 determines that a MAC address is not in authorization credentials 120), it is likely that the physical user input is not originating from an authorized user. Thus, in response to determining that the identifier is not present in the database, verification module 116 determines that the physical user input was not received from the authorized user.

This differs from techniques involving two-step authorization in which a code is sent via email or text that can potentially be viewed on an authorized device because here, the presence of the device itself is important. Email and text are mediums of communication that are vulnerable to interception and theft. Having the physical device in the presence of computing device 106 proves that the authorized user is present at the given location.

To prevent false positives in which an authorized user introduces a new device that is not identified in authorization credentials 120 (thus causing verification module 116 to assume that the user is not present in environment 101), an authorized user may request to register new devices in authorization credentials 120. In this case, the registration request must be accompanied with identifiers of the authorized user (e.g., biometrics) to prevent an unauthorized user from adding unauthorized device identifiers to authorization credentials 120.

Security component 110 uses a combination of sensors to evaluate whether an authorized user is present in environment 101 and subsequently whether the authorized user is accessing computing device 106. For example, when security component 110 sends a discovery message, depending on the amount of devices in the vicinity of computing device 106, security component 110 may receive several confirmation messages in which some devices are registered in authorization credentials 120 and others are not. Unless there is only one person present at a time near computing device 106, this makes it difficult to come to a verdict on whether the authorized user is present or not. That is why security component 110 also considers factors such as whether sensor 108b captured a facial image of the authorized user, whether sensor 108a captured an audio clip of the authorized user, and whether sensor 108c received a badge scan from a physical identity card of the authorized user. Again, only three sensors are shown in FIG. 1 for simplicity. One skilled in the art will appreciate that there may be more or fewer sensors in environment 101. For example, security component 110 may query whether a device registered as belong to an authorized user in authorization credentials 120 (e.g., a smartphone) connected to a wireless sensor such as a router in environment 101.

If the authorized user 104 is not present in environment 101, security component 110 does not execute the physical user input, and notification module 118 may notify the authorized user of the usage anomaly. For example, authorization credentials 120 may also include emergency contact information of authorized user 104 (e.g., an email address, phone number, etc.) where usage anomaly notifications may be sent. Notification module 118 may thus retrieve the information and alert authorized user 104. In some aspects, the associated environmental sensor data may be included in the notification (e.g., a facial image of user 102 and/or an audio clip).

The window of time is a simple way to verify whether an authorized user is present without performing considerable amounts of processing. The window of time limits the amount of environmental sensor data that needs to be parsed. For example, if a physical user input was intercepted at computing device 106 at 1:00 pm, environmental sensor data from 7:00 am may not be relevant to verifying the presence of authorized user 104. The most relevant time period may be immediately before and after the interception. Accordingly, security component 110 may use an iterative time window. For example, security component 110 may first set the time window to 10 minutes and analyze the data within 12:55 pm and 1:05 pm. If verification module 116 cannot identify authorized user 104, security component 110 may increase the time window from 12:50 pm to 1:10 pm. If verification module 116 still cannot identify authorized user 104 in environment 101 after a threshold number of time window expansions (e.g., 3 expansions), security component 110 may determine that authorized user 104 is not present in environment 101. This approach is used to quickly dismiss user inputs received when a user was not physically present without expending processor power/memory. If the time window is too large (e.g., 12:30 pm to 1:30 pm) and does not need to be because authorized user 104 is readily identified at the 12:59 pm mark, the amount of resources taken to scan starting from 12:30 pm are wasted. This is prevented by starting with a small time window and increasing the window size whenever the authorized user cannot be identified (i.e., only as necessary).

In some aspects, the increase in window size may be predetermined. For example, security component 110 may set the first window size to 10 minutes, the second window size to 20 minutes, the third window size to 30 minutes, etc. In some aspects, the increase in window size is based on a difference between a confidence level (e.g., a quantitative value) of verification module 116 and a threshold confidence level. For example, when comparing parsed environmental data to entries in authorization credentials 120, verification module 116 may generate a confidence level that is a function of the similarity values between the compared attributes (e.g., the amount of pixels or facial features that match between two facial images), how close two voices are in audio clips, etc. Suppose that a confidence level is given on a scale of 1 to 100. If authorized user 104 is not looking directly at a sensor that captures video during the first time window (e.g., in a 10 minute span), the image comparison value may not be at a minimum value that indicates a match. For example, if a match requires the comparison value to be at least 75 out of 100, and the comparison value is 70, verification module 116 may not indicate that the match exists. Likewise, if the audio clip captured by the sensor has background noise, a voice clip match may indicate a 60 out of 100 resemblance.

To generate a confidence level, verification module 116 may take the average of both values (e.g., (70+60)/2=65). Suppose that the threshold confidence level is 75. The difference between the confidence level and the threshold confidence level is thus 10. Generally, the larger the difference, the more information is needed to verify the identity of authorized user 104. The smaller the difference, the less information is needed. For example, in the latter, verification module 116 may simply need a few more frames in which authorized user is looking directly at the sensor capturing video. Accordingly, the time window expansion does not have to be large. Security component 110 may therefore increase the time window size based on this difference. Security component 110 may use, for example, a table that converts a difference into additional time (e.g., a difference of 10 needs an increase in window size by 5 minutes whereas a difference of 20 needs an increase in window size by 15 minutes).

If the authorized user 104 was present during the window of time, a second verification process is initiated. More specifically, in response to determining that authorized user 104 is present in environment 101, correlation engine 114 correlates the user input with the environmental sensor data temporally to verify whether the authorized user had physical access to computing device 106. The correlation process divides the environmental sensor data into a plurality of events. Examples of events include, but are not limited to, "user entered room," "user exited room," "second user entered room," "system failure," "location check-in," etc. Correlation engine 114 then determines when each event took place. For example, sensor 108c may be a security camera that shows authorized user 104 entering environment 101 at 4:00 pm. Correlation engine 114 interprets this as an event in which authorized user 104 entered the room. Subsequently, correlation engine 114 may determine that the physical user input was received at 4:01 pm. Because authorized user 104 is the sole person in environment 101 and was present in environment 101, correlation engine 114 may determine that authorized user 104 had physical access to computing device 106. Accordingly, security component 110 may enable the execution of the physical user input. This logic may be governed by a plurality of predetermined rules. For example, a first rule may query whether a video of the user entering environment 101 was detected prior to the physical user input interception. Another rule may query whether a video of the user exiting environment 101 was detected prior to the physical user input interception.

In contrast, consider a scenario in which correlation engine 114 detects that user 102 entered environment 101 after authorized user 104 at 4:05 pm. Correlation engine 114 may further determine an event based on the environmental sensor data that indicates that authorized user 104 exited the environment 101 at 4:06 pm. Subsequently, correlation engine 114 may determine that the physical user input was received at 4:07 pm. In this case, authorized user 104 was present in environment 101 during the window of time (e.g., between 4:02 pm and 4:12 pm) and security component 110 will trigger the correlation process. However, correlation engine 114 would determine that based on the timeline of events, authorized user 104 did not have physical access to computing device 106 when the physical user input was received (i.e., because a combination of sensors indicate that the user 104 has left). In response to determining that authorized user 104 did not have physical access to computing device 106, security component 110 does not execute (e.g., blocks) the physical user input and notification module 118 may notify authorized user 104 of the usage anomaly.

Figure 2:
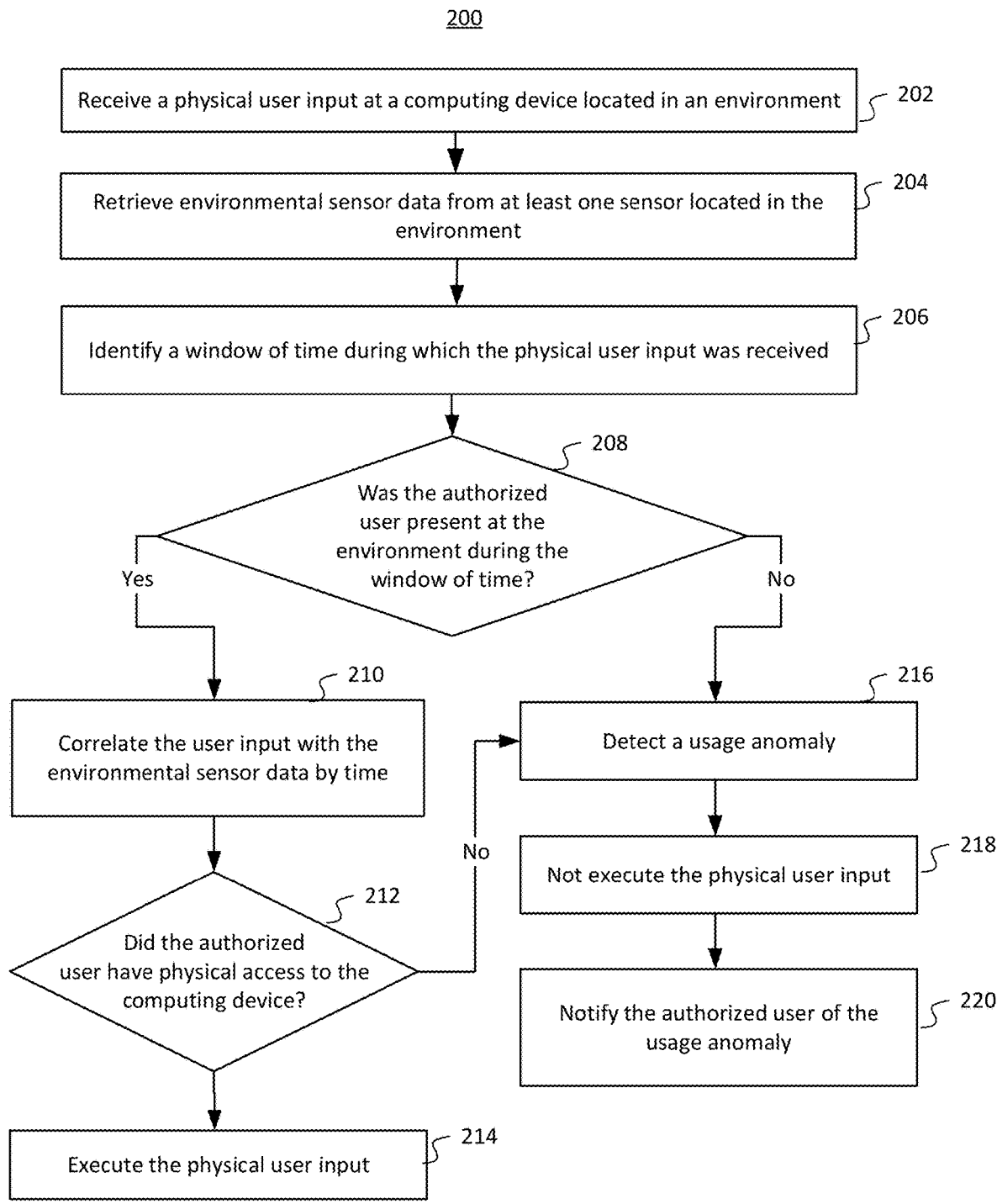
FIG. 2 illustrates a flow diagram of a method for detecting usage anomalies based on environmental sensor data.

FIG. 2 illustrates a flow diagram of method 200 for detecting usage anomalies based on environmental sensor data. At 202, security component 110 receives a physical user input at a computing device (e.g., device 106) located in an environment (e.g., environment 101). At 204, security component 110 retrieves environmental sensor data from at least one sensor (e.g., sensor 108b) located in the environment. At 206, security component 110 identifies a window of time during which the physical user input was received. At 208, security component 110 determines whether an authorized user was present in the environment during the window of time. In response to determining that the authorized user was present, method 200 advances to 210, where security component 110 correlates the user input with the environmental sensor data by time. At 212, security component 110 determines whether the authorized user had physical access to the computing device at the time the physical user input was received. In response to determining that the authorized user did have physical access, at 214, security component 110 executes the physical user input.

However, if security component 110 determines that the authorized user did not have physical access (at 212) or was not present in the environment (at 208), method 200 advances to 216, where security component 110 detects a usage anomaly. At 218, security component 110 does not execute (e.g., blocks) the physical user input. At 220, security component 110 notifies the authorized user of the usage anomaly.

Figure 3:
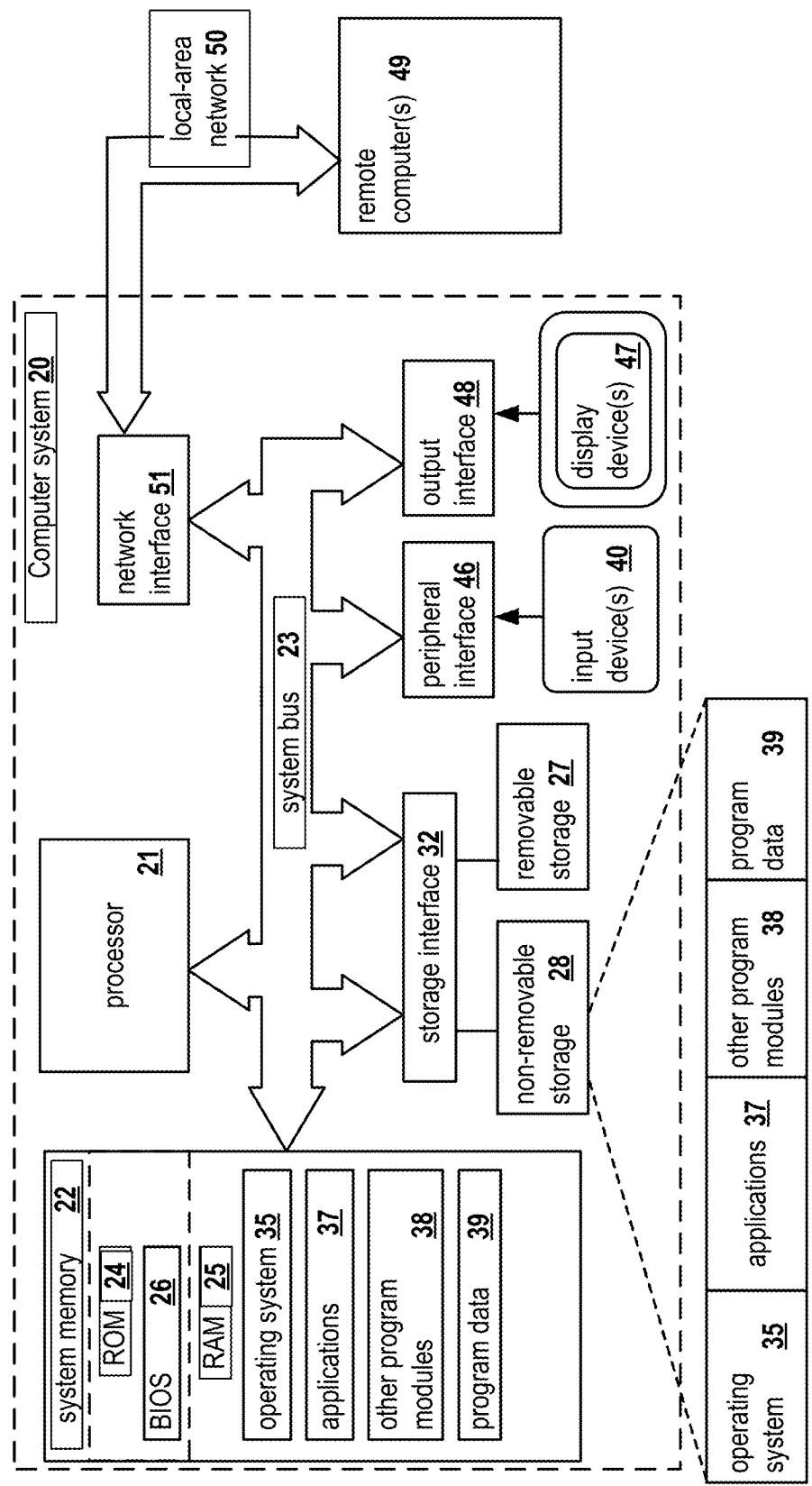
FIG. 3 presents an example of a general-purpose computer system on which aspects of the present disclosure can be implemented.

FIG. 3 is a block diagram illustrating a computer system 20 on which aspects of systems and methods for detecting usage anomalies based on environmental sensor data may be implemented in accordance with an exemplary aspect. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, I²C, and other suitable interconnects. The central processing unit 21 (also referred to as a processor) can include a single or multiple sets of processors having single or multiple cores. The processor 21 may execute one or more computer-executable code implementing the techniques of the present disclosure. For example, any of commands/steps discussed in FIGS. 1-2 may be performed by processor 21. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices.

The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system. Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for detecting usage anomalies based on environmental sensor data, the method comprising:
   receiving a physical user input at a computing device located in an environment;
   retrieving environmental sensor data from at least one sensor located in the environment;
   identifying a window of time during which the physical user input was received; and
   verifying a presence of an authorized user of the computing device at the environment during the window of time based on the environmental sensor data;
   in response to determining that the authorized user was present in the environment during the window of time, correlating the user input with the environmental sensor data by time to verify whether the authorized user had physical access to the computing device, wherein correlating the user input with the environmental sensor data comprises determining whether the environmental sensor data indicates that the authorized user left the environment before the physical user input was received; and
   in response to determining that the authorized user left the environment before the physical user input was received, detecting a usage anomaly and not executing the physical user input.

2. The method of claim 1, further comprising:
   notifying the authorized user of the usage anomaly.

3. The method of claim 1, further comprising:
   in response to determining that the authorized user had physical access to the computing device, executing the physical user input.

4. The method of claim 3, further comprising:
   in response to determining that the authorized user did not have physical access to the computing device, not executing the physical user input and notifying the authorized user of the usage anomaly.

5. The method of claim 1, wherein the at least one sensor comprises one or more of:
   (1) a camera installed at the environment,
   (2) a door badge scanner at the environment,
   (3) a light sensor at the environment,
   (4) a microphone at the environment,
   (5) a personal computing device of the authorized user.

6. The method of claim 1, wherein determining whether the physical user input was received from the authorized user of the computing device further comprises:
   transmitting, via the computing device, a discovery message to all computing devices in the environment in a vicinity of the computing device;
   receiving a confirmation message from another computing device, wherein confirmation message includes an identifier of the another computing device;
   determining whether the identifier of the another computing device is present in a database of authorized identifiers; and
   in response to determining that the identifier is not present in the database, determining that the physical user input was not received from the authorized user.

7. The method of claim 1, wherein the physical user input comprises accessing data that is restricted to the authorized user.

8. A system for detecting usage anomalies based on environmental sensor data, the system comprising:
a memory; and
a hardware processor communicatively coupled with the memory and configured to:
receive a physical user input at a computing device located in an environment;
retrieve environmental sensor data from at least one sensor located in the environment;
identify a window of time during which the physical user input was received;
verify a presence of an authorized user of the computing device at the environment during the window of time based on the environmental sensor data;
in response to determining that the authorized user was present in the environment during the window of time, correlate the user input with the environmental sensor data by time to verify whether the authorized user had physical access to the computing device, wherein correlating the user input with the environmental sensor data comprises determining whether the environmental sensor data indicates that the authorized user left the environment before the physical user input was received; and
in response to determining that the authorized user left the environment before the physical user input was received, detect a usage anomaly and not execute the physical user input.

9. The system of claim 8, wherein the hardware processor is further configured to:
notify the authorized user of the usage anomaly.

10. The system of claim 8, wherein the hardware processor is further configured to:
in response to determining that the authorized user had physical access to the computing device, execute the physical user input.

11. The system of claim 10, wherein the hardware processor is further configured to:
in response to determining that the authorized user did not have physical access to the computing device, not execute the physical user input and notify the authorized user of the usage anomaly.

12. The system of claim 8, wherein the at least one sensor comprises one or more of:
(1) a camera installed at the environment,
(2) a door badge scanner at the environment,
(3) a light sensor at the environment,
(4) a microphone at the environment,
(5) a personal computing device of the authorized user.

13. The system of claim 8, wherein the hardware processor is further configured to determine whether the physical user input was received from the authorized user of the computing device by:
transmitting, via the computing device, a discovery message to all computing devices in the environment in a vicinity of the computing device;
receiving a confirmation message from another computing device, wherein confirmation message includes an identifier of the another computing device;
determining whether the identifier of the another computing device is present in a database of authorized identifiers; and
in response to determining that the identifier is not present in the database, determining that the physical user input was not received from the authorized user.

14. The system of claim 8, wherein the physical user input comprises accessing data that is restricted to the authorized user.

15. A non-transitory computer readable medium storing thereon computer executable instructions for detecting usage anomalies based on environmental sensor data, including instructions for:
receiving a physical user input at a computing device located in an environment;
retrieving environmental sensor data from at least one sensor located in the environment;
identifying a window of time during which the physical user input was received;
verifying a presence of an authorized user of the computing device at the environment during the window of time based on the environmental sensor data; and
in response to determining that the authorized user was present in the environment during the window of time, correlating the user input with the environmental sensor data by time to verify whether the authorized user had physical access to the computing device, wherein correlating the user input with the environmental sensor data comprises determining whether the environmental sensor data indicates that the authorized user left the environment before the physical user input was received; and
in response to determining that the authorized user left the environment before the physical user input was received, detecting a usage anomaly and not executing the physical user input.

* * * * *